United States Patent [19]
Nagata et al.

[11] Patent Number: 5,568,840
[45] Date of Patent: Oct. 29, 1996

[54] STEP FLOOR FOR A SMALL SNOWMOBILE

[75] Inventors: Tadaaki Nagata; Takao Kouchi; Yoshinobu Itani, all of Saitama, Japan

[73] Assignee: Honda Giken Kogyo Kabushiki Kaisha, Tokyo, Japan

[21] Appl. No.: 478,807

[22] Filed: Jun. 7, 1995

[30]     Foreign Application Priority Data

Sep. 26, 1994  [JP]  Japan .................... 6-229763

[51] Int. Cl.$^6$ ............................................. B62M 27/02
[52] U.S. Cl. ........................................ 180/190; 180/9.23
[58] Field of Search ................................. 180/180, 181,
          180/186, 190, 9.23; 280/14.2, 14.3; 114/344,
          355, 357

[56]              References Cited

U.S. PATENT DOCUMENTS 4,307,788  12/1981  Shelton ................................ 180/181

FOREIGN PATENT DOCUMENTS 55-5675  7/1980  Japan ..................................... 180/190

Primary Examiner—Kevin Hurley
Attorney, Agent, or Firm—Birch, Stewart, Kolasch & Birch, LLP

[57]              ABSTRACT

A pair of upright portions are provided on the opposite side portions of a floor on which a driver of a small snowmobile stands. A pad extends inwardly from an upper portion of each of the upright portions to securely hold the feet of the driver while maintaining adequate floor surface area for the feet. Further, a radiator for cooling an engine is disposed along a lower face of the floor so that it melts snow lying on the floor.

14 Claims, 5 Drawing Sheets

STEP FLOOR FOR A SMALL SNOWMOBILE

BACKGROUND OF THE INVENTION

1. Field of the Invention

This invention relates to improvements in the step floor of a small snowmobile of the type driven by a standing operator.

2. Description of Background Art

Conventionally, in a small snowmobile of the type driven by a standing operator, a driver stands on a step floor while maintaining his or her balance, and operates a steering member of the snowmobile. One example of such an arrangement is disclosed in the U.S. Pat. No. 4,307,788.

However, the step floor disclosed in U.S. Pat. No. 4,307,788 is small in width, and therefore it has several disadvantages. For example, it is inconvenient for the driver to change the position of his or her feet, and it lacks a secure foothold for the feet of the driver. Further, when the driver straddles the step floor, the force applied to maintain his or her balance is less effective.

Yet another disadvantage is that where snow lies on the step floor, the feet of the driver are liable to slip.

SUMMARY AND OBJECTS OF THE INVENTION

In order to overcome the above-mentioned disadvantages, a pair of upright portions are provided on the opposite sides of a step floor of a small snowmobile. A pad extends inwardly at an upper portion of each of the upright portions.

Further, a radiator for cooling an engine is disposed along a lower face of the step floor of the small snowmobile. These two features may be employed separately or in combination with one another.

The widthwise dimension at a position above the step floor is reduced so that a secure holding feeling at the feet of the driver is obtained while assuring sufficient floor surface area for the feet. In particular, if the feet of the driver contact and extend along the pads so as to be supported by the pads, then the force applied is effective to allow the driver to maintain his or her balance.

Further, even if snow lies on the step floor, it is melted by the radiator on the lower face of the step floor, and the traction of the feet of the driver is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Embodiments of the present invention will be described with reference to the drawings.

Figure 1:
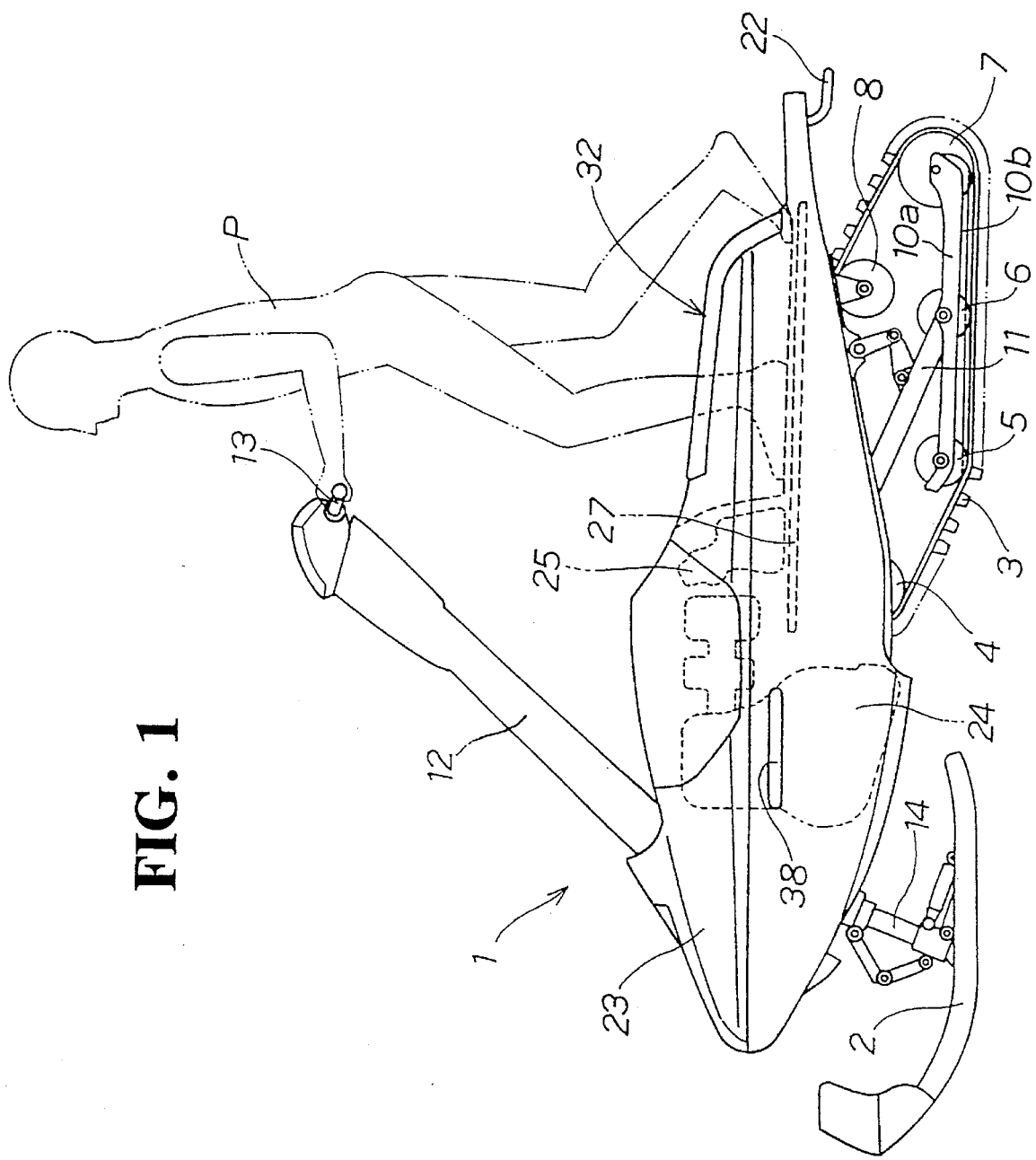
FIG. 1 is a view of an entire small snowmobile to which a step floor of the present invention is applied.

As shown in FIG. 1, a small snowmobile of the type driven by a standing operator includes front skis 2 provided under a front portion of a body 1 and includes a crawler belt 3 under a rear portion of the body 1.

The crawler belt 3 extends along and around a driving wheel 4 substantially at the center of the body 1 and a plurality of auxiliary wheels 5, 6, 7 and 8. Shafts of the lower auxiliary wheels 5, 6 and 7 are connected to each other by a slide rail 10a. The shaft of the auxiliary wheel 6 at the middle location is supported on a swing arm 11.

Figure 2:
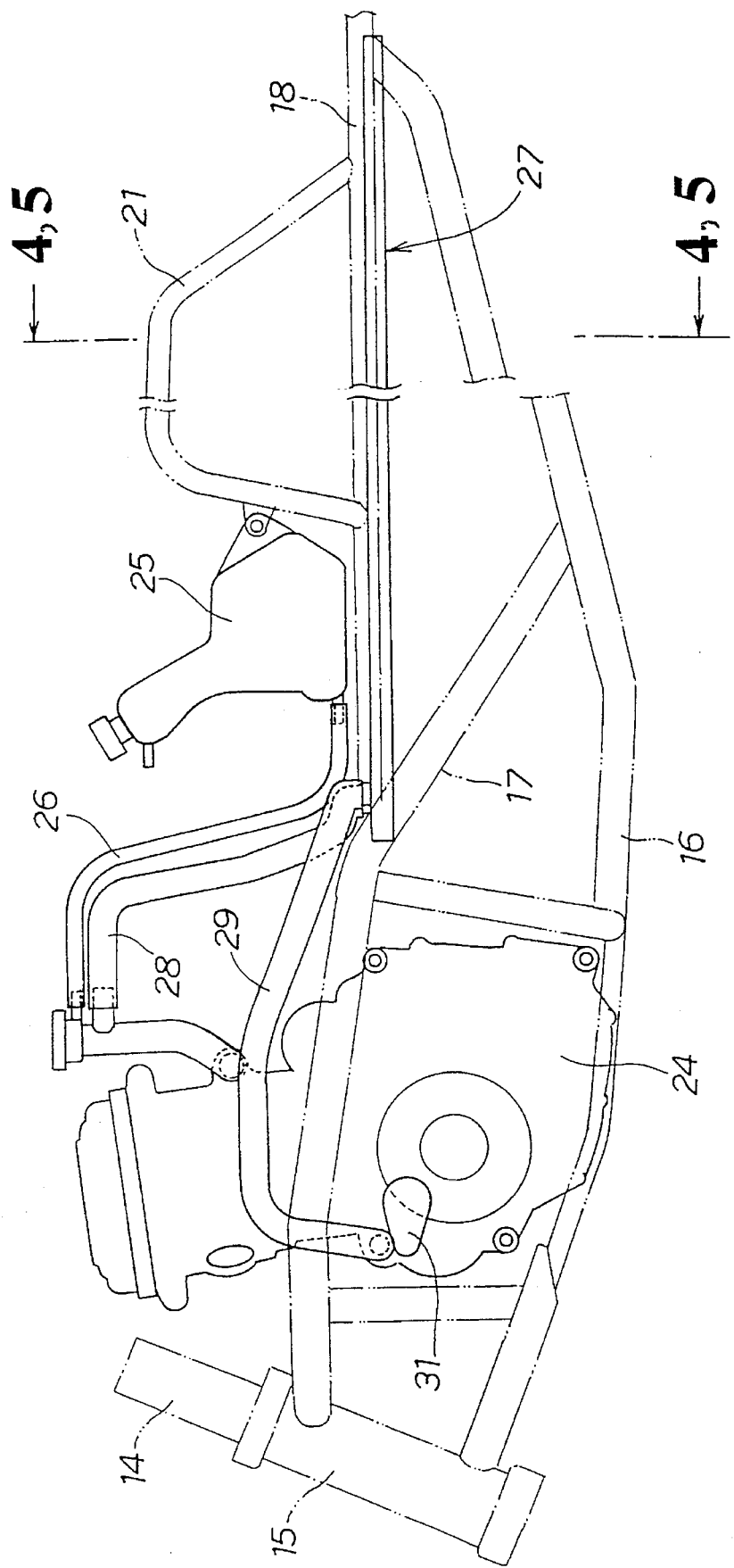
FIG. 2 is a side elevational view showing a circulation system for cooling water for an engine.

A steering post 12 is provided at a forward portion of the body 1 and extends obliquely uprightly, and a handlebar 13 is mounted at an upper end of the steering post 12. A lower steering shaft 14 is connected to a lower portion of the steering post 12 and rotates about its axis when the handlebar 13 is operated. The lower steering shaft 14 is fitted in and supported for rotation on a head pipe 15 secured to the body frame, as shown in FIG. 2. The lower steering shaft 14 is coupled to the front skis 2.

A pair of left and right main frames 16 and a pair of left and right upper frames 17 which form the skeleton of the front portion of the body 1 extend rearwardly in a substantially symmetrical relationship to each other from the head pipe 15. The upper frames 17 are joined to the corresponding main frames 16 in the proximity of a central portion of the body 1. The main frames 16 further extend rearwardly and upwardly. A rear frame 18 forms the skeleton of the rear portion of the body 1. The rear frame 18 extends horizontally and rearwardly from an intermediate portion of each of the upper frames 17 and is joined to a corresponding one of the main frames 16, and further extends rearwardly.

An engine 24, a radiator liquid reservoir tank 25, and a side glove rail 38 for moving the vehicle body are shown in FIG. 1–4.

Figure 4:
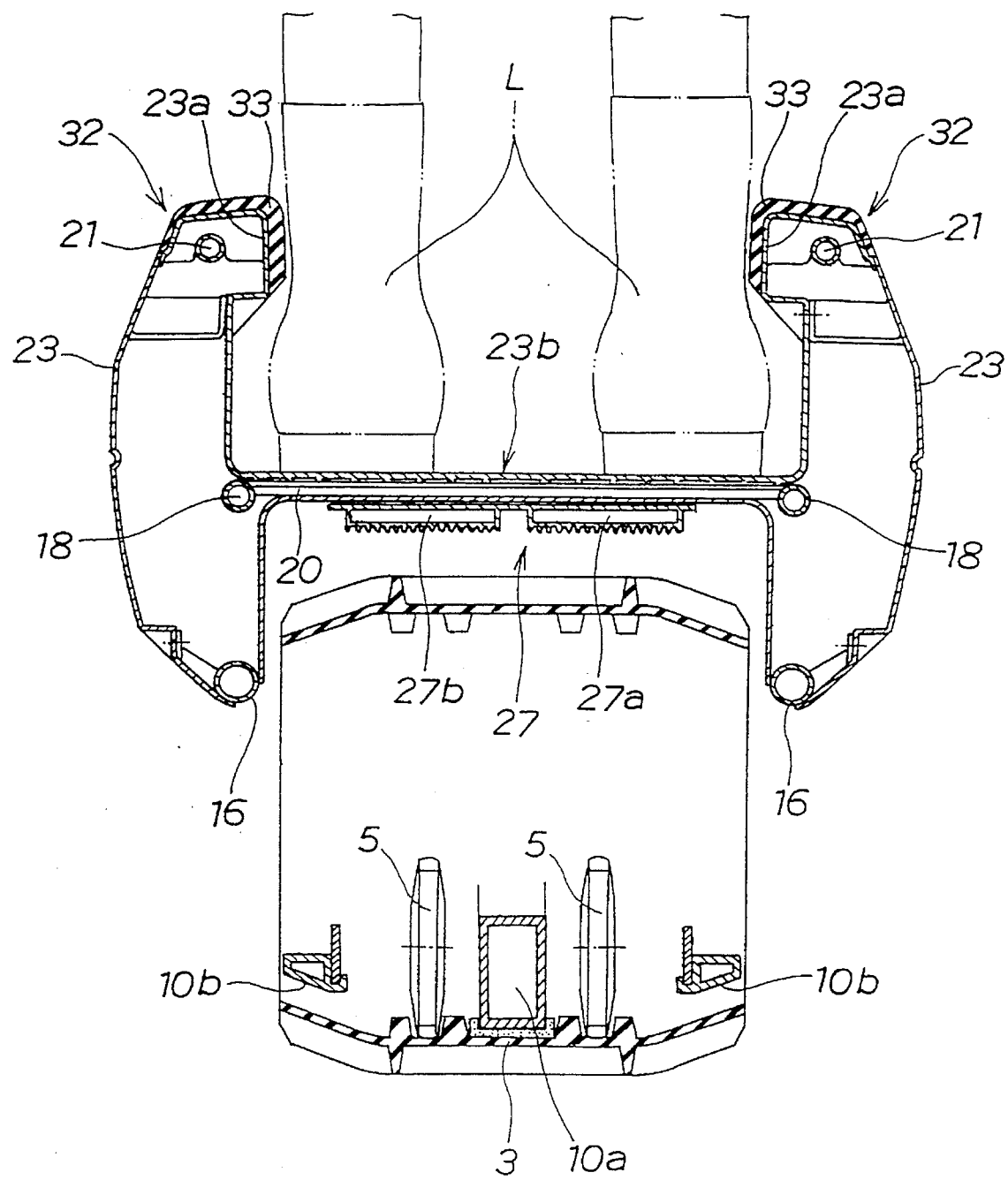
FIG. 4 is a sectional view taken along line 4—4 of FIG. 2.

A cross frame 20 as shown in FIG. 4 is provided between the left and right rear frames 18 such that a driver P may ride standing on a floor 23b on the cross frame 20. An elongated channel-shaped side frame 21 is mounted in a longitudinal direction on each of the rear frames 18. A rear glove rail 22 for moving the vehicle body is provided at a rear end portion of each of the rear frames 18.

Figure 5:
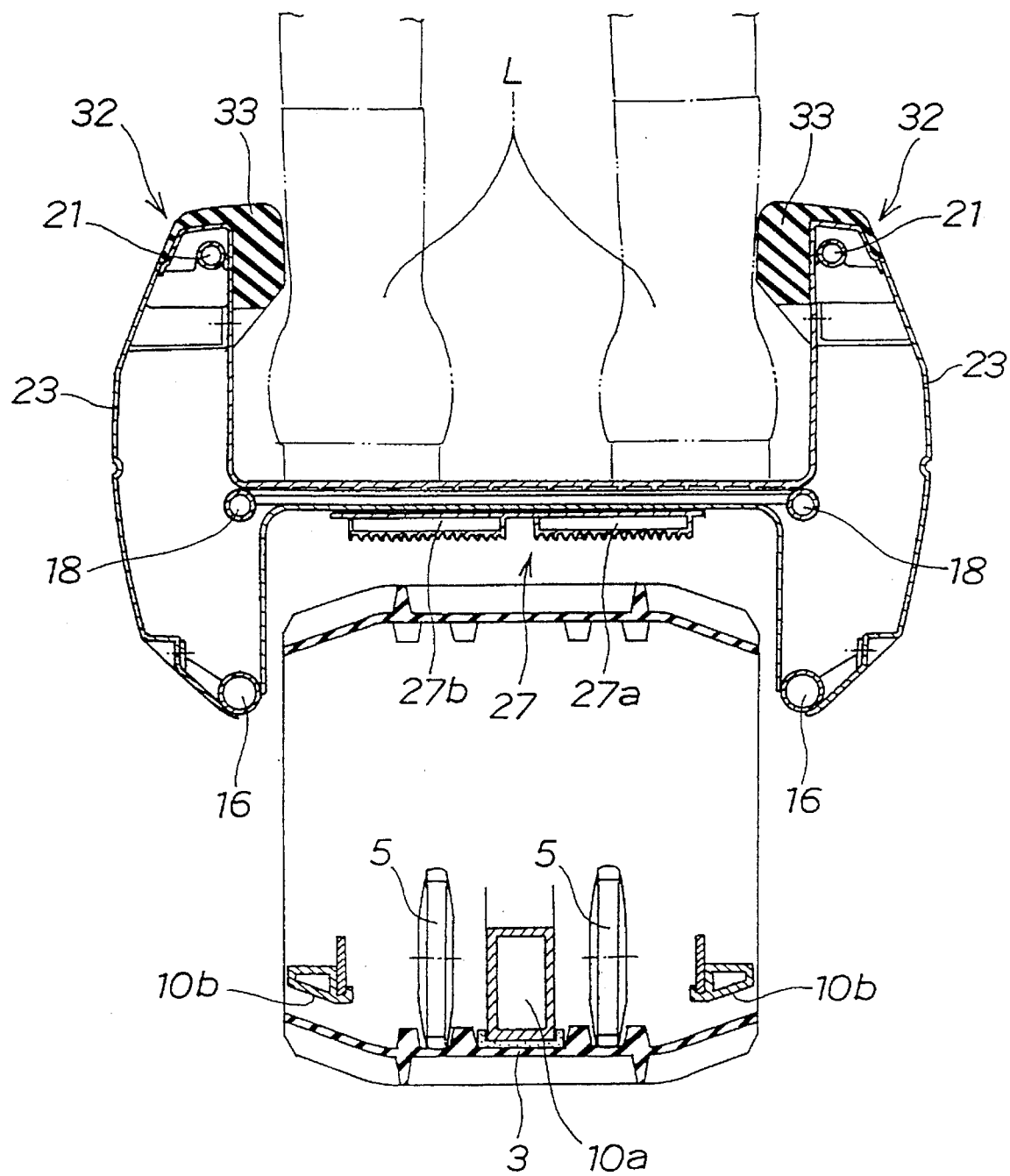
FIG. 5 is a sectional view taken along line 5—5 of FIG. 2 but showing a second embodiment.

Side slide rails 10b which extend on the opposite sides of the center slide rail 10a are shown in FIGS. 4 and 5.

Figure 3:
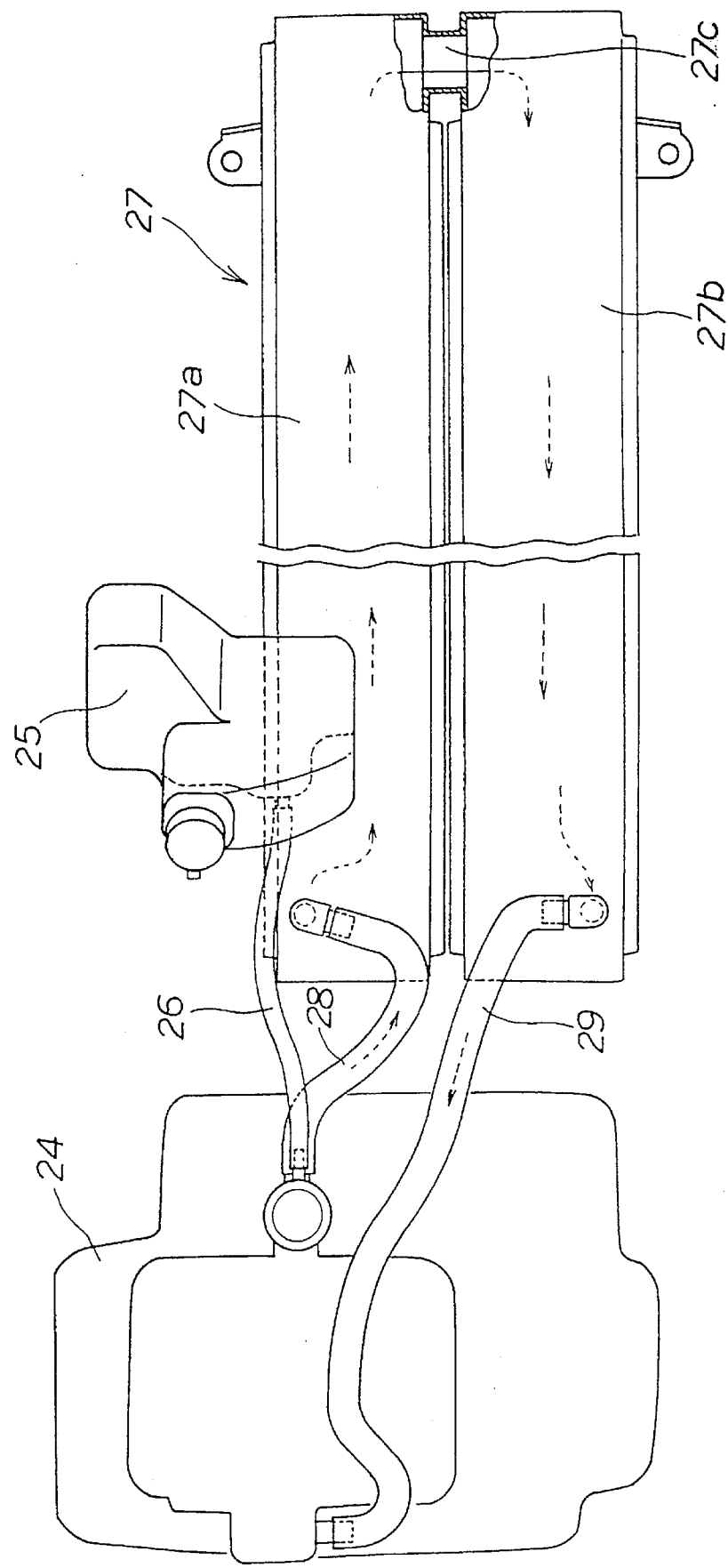
FIG. 3 is a plan view of the circulation system for cooling water.

The circumference of the front portion of the body 1, the opposite side faces of the rear portion of the body 1, and the upper face of the cross frame 20 are covered with a body cover 23. An engine compartment is formed in the front portion of the body 1, while the floor 23b is formed in the rear portion of the body 1. A water-cooled engine 24 is disposed in the engine compartment rearwardly of the head pipe 15, as shown in FIGS. 2 and 3. A radiator liquid reservoir tank 25 for supplying cooling water to the engine 24 is mounted on one of the side frames 21 and secured to an upper portion forwardly of the floor 23b. A connection hose 26 is connected between the tank 25 and the engine 24.

A radiator 27 for radiating heat from cooling water which has circulated in the engine 24 is provided along a lower face of the floor 23b, as shown in FIGS. 3 and 4. The radiator 27 is divided into left and right portions so as to increase the cooling water flow path thereof, and has a large number of heat radiating fins provided on a lower face thereof. As shown in FIG. 3, cooling water which has cooled the engine 24 is introduced into the right radiator 27a by a discharge hose 28. Cooling water having been circulated from the right radiator 27a into the left radiator 27b and cooled by them is returned to the engine 24 by way of an inlet hose 29. A communication path 27c is provided between the right radiator 27a and the left radiator 27b, and a water pump 31 is provided for circulating the cooling water.

Accordingly, even if snow lies on the floor 23b, it can be melted by heat radiated from the radiator 27 located thereunder.

The opposite sides of the rear portion of the body 1 are constructed such that the body cover 23 covers the side frame 21, the rear frame 18 and the main frames 16 so as to form a pair of upright portions 32, as shown in FIG. 4. The upper portions of the upright portions 32 are formed as a pair of extensions 23a extending inwardly. A pad 33 made of foamed urethane or similar material is provided in an area extending from an outer face, along an upper face, to an inner face of each of the extensions 23a.

A second embodiment of the pads 33 which extend inwardly is shown in FIG. 5. In this embodiment, the extensions 23a are not formed on the inner sides of the body cover 23 of the upright portions 32. Instead, pads 33 of an increased thickness are mounted on the inner faces of the upper portions of the flattened body cover 23 in such a manner as to extend inwardly. In this embodiment, since no undercut portion is involved upon formation of the body cover 23 by a press, a good mold drawability is obtained.

Therefore, when the driver P stands on the floor 23b, the feet L can be held in place by the pads 33. Since the widthwise dimension of the area below the pads 33 is larger, even snow shoes having a wide base can be used freely. Further, it is easy for the driver to change the position of his or her feet. Alternatively, the feet may be arranged to contact and extend along the pads 33 at the upper portions of the upright portions 32 on opposite sides.

With the step floor having the construction described above, even if snow lies on the floor 23b, it can be melted by the radiator 27 thereunder, and the feet of the driver can be stabilized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A snowmobile having a step floor, said step floor comprising:

a floor portion having a predetermined width on which feet of an operator of said snowmobile may be placed; and a pair of upright portions on right and left sides of said floor portion, said upright portions each having an inwardly directed resilient pad at an upper end thereof, said resilient pads being spaced apart a distance less than said predetermined width, said resilient pads providing an engagement surface for legs of said operator, thereby improving the stability of said operator on said snowmobile.

2. The snowmobile according to claim 1, wherein said resilient pad extends across a top surface of said upright portions and onto an outwardly directed upper portion of said upright portions.

3. The snowmobile according to claim 2, wherein said upright portions each have an inwardly directed projection at an upper end thereof, said inwardly directed projections being spaced apart a distance less than said predetermined width, said inwardly directed projections including said resilient pads thereon.

4. The snowmobile according to claim 3, wherein said snowmobile further includes a radiator for cooling an engine of said snowmobile, said radiator being mounted directly under said step floor, whereby heat radiated from said radiator increases the temperature of the step floor and assists in melting any snow that may accumulate on said step floor.

5. The snowmobile according to claim 4, wherein said step floor has a predetermined length and said predetermined width, and wherein said radiator has a length and a width substantially equal to said predetermined length and said predetermined width, respectively.

6. The snowmobile according to claim 1, wherein said snowmobile further includes a radiator for cooling an engine of said snowmobile, said radiator being mounted directly under said step floor, whereby heat radiated from said radiator increases the temperature of the step floor and assists in melting any snow that may accumulate on said step floor.

7. The snowmobile according to claim 6, wherein said step floor has a predetermined length and said predetermined width, and wherein said radiator has a length and a width substantially equal to said predetermined length and said predetermined width, respectively.

8. The snowmobile according to claim 1, wherein said upright portions each have an inwardly directed projection at an upper end thereof, said inwardly directed projections being spaced apart a distance less than said predetermined width, said inwardly directed projections including said resilient pads thereon.

9. The snowmobile according to claim 8, wherein said snowmobile further includes a radiator for cooling an engine of said snowmobile, said radiator being mounted directly under said step floor, whereby heat radiated from said radiator increases the temperature of the step floor and assists in melting any snow that may accumulate on said step floor.

10. The snowmobile according to claim 9, wherein said step floor has a predetermined length and said predetermined width, and wherein said radiator has a length and a width substantially equal to said predetermined length and said predetermined width, respectively.

11. A snowmobile having a step floor, said step floor comprising:

a floor portion having a predetermined length and a predetermined width on which feet of an operator of said snowmobile may be placed; and a radiator for cooling an engine of said snowmobile, said radiator being mounted directly under said step floor, whereby heat radiated from said radiator increases the temperature of the step floor and assists in melting any snow that may accumulate on said step floor.

12. The snowmobile according to claim 11, wherein said radiator has a length and a width substantially equal to said predetermined length and said predetermined width, respectively, of said step floor.

13. The snowmobile according to claim 12, wherein said radiator includes a right portion and a left portion spaced from said right portion, and further includes a fluid connection pipe interconnecting rear portions of said right portion and said left portion.

14. The snowmobile according to claim 11, wherein said radiator includes a right portion and a left portion spaced from said right portion, and further includes a fluid connection pipe interconnecting rear portions of said right portion and said left portion.

* * * * *